Figure 1:
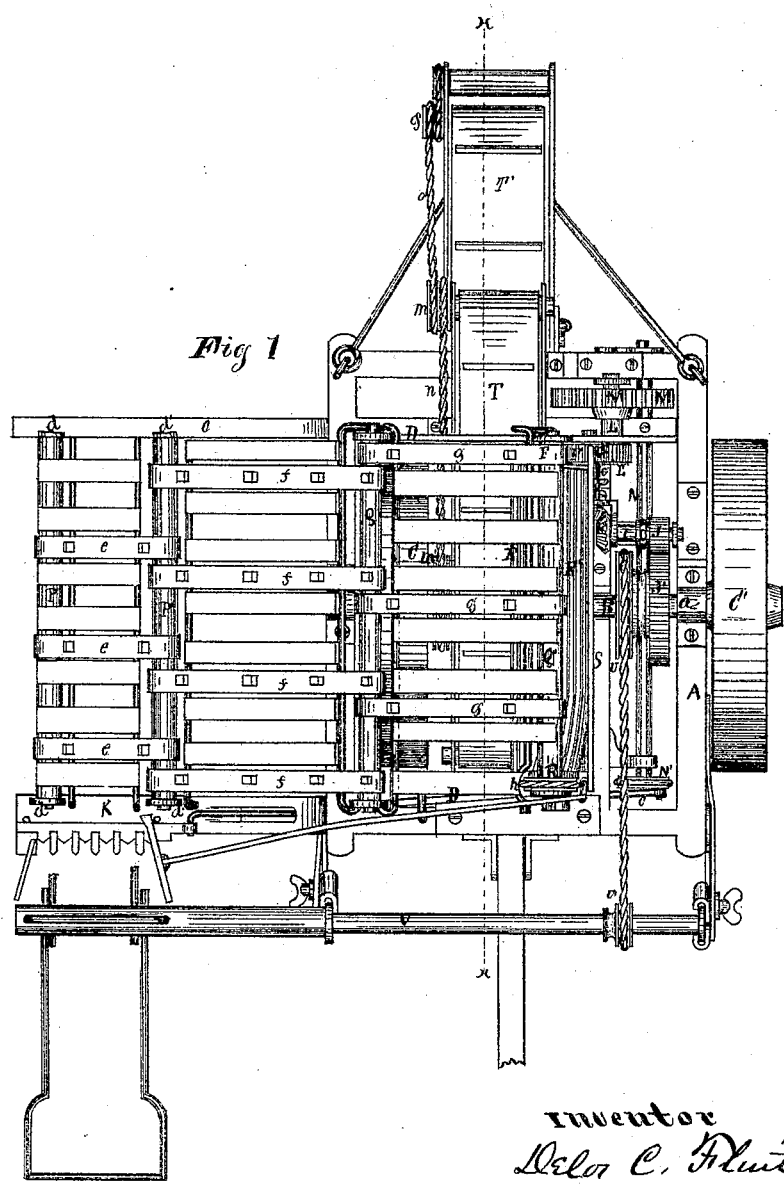

D. C. FLINT.
Improvement in Corn-Harvesters.

No. 115,046. Patented May 23, 1871.

Witnesses
A. H. Sherburne
N. C. Gridley

Inventor
Delos C. Flint
By Farwell & Co
his Attys

D. C. FLINT.
Improvement in Corn-Harvesters.
No. 115,046.  
2 Sheets--Sheet 2.  
Patented May 23, 1871.
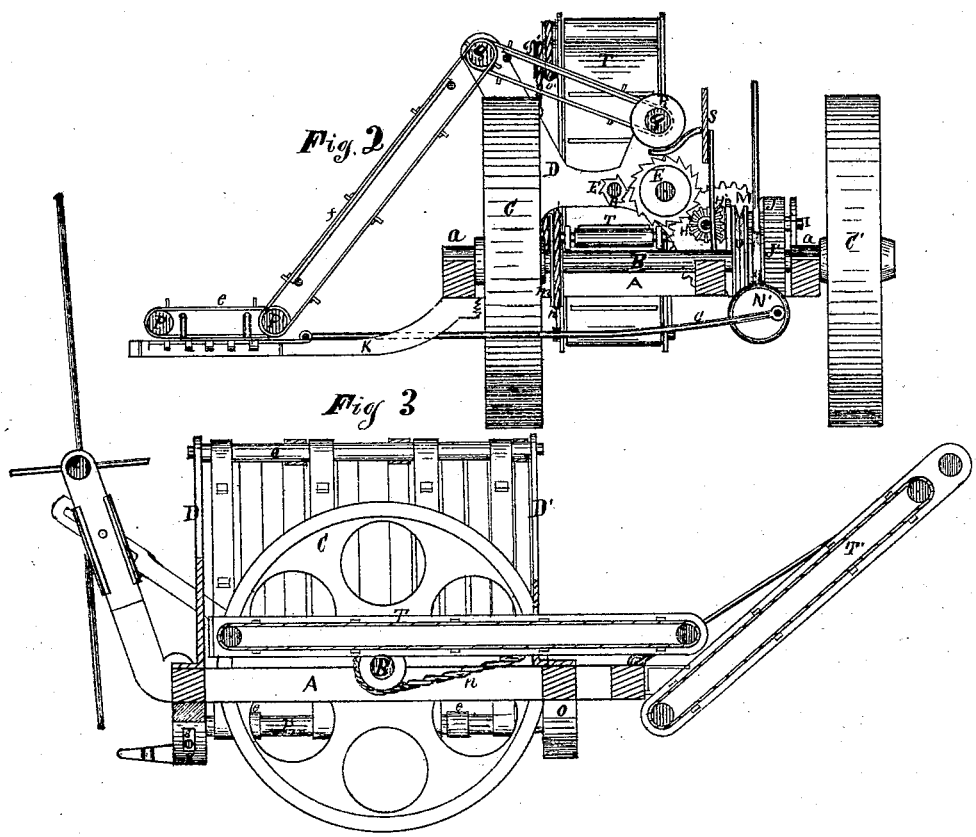

115,046

UNITED STATES PATENT OFFICE.

DELOS C. FLINT, OF BARDOLPH, ILLINOIS.

IMPROVEMENT IN CORN-HARVESTERS.

Specification forming part of Letters Patent No. 115,046, dated May 23, 1871.

*To all whom it may concern:*

Be it known that I, DELOS C. FLINT, of Bardolph, in the county of McDonough and State of Illinois, have invented certain new and useful Improvements in Corn-Harvesters; and I do hereby declare the following to be a full, clear, and exact description thereof, which will enable others skilled in the art to make and use the same, reference being had to the accompanying drawing forming part of this specification, in which—

Figure 1, plate 1, is a top view of my invention; Fig. 2, plate 2, is a front elevation of the same, with the reel and a portion of the frame removed, showing moving parts thereof; and Fig. 3, plate 2, is a vertical longitudinal section, showing those parts of the machine which are at the left hand of the line $x\ x$ drawn through Fig. 1.

Similar letters of reference indicate like parts in the several figures of the drawing.

My invention relates to that class of corn-harvesters by which the stalks are cut from the hill and conveyed to the husking-rollers by a system of carrying-belts; and the improvement consists in the construction and combination of the several parts, a description of which in detail will be hereinafter fully given.

In the drawing, A represents the frame, which may be as shown, or may be of any suitable form that will receive the moving parts of the machine. B is the main or driving-shaft, which is secured to the frame laterally by boxes $a\ a$, firmly bolted to the side pieces of the same. Upon the ends of said shaft are affixed the driving-wheels C C', which support the machine, and by which motion is imparted to the moving parts thereof. Attached to the cross-girts of the frame are vertical uprights D D', through which pass the bearings of the husking-rollers E E', the same being so arranged as to freely revolve therein. The said rollers are fluted longitudinally their entire length, and are provided at one end with gear-wheels F F', so arranged as to engage one with the other, the said wheel F' also engaging with a gear-wheel, G, on shaft G'. This shaft is provided at its opposite end with a bevel-gear, H, which engages a like gear-wheel, H', on shaft I. Affixed to the opposite end of shaft I is a gear-pinion, J, which engages a gear-wheel, J', on the main driving-shaft B. Thus, as said shaft is rotated by the forward movement of the machine, a reverse rotary movement is imparted to the husking-rollers. Attached to the front and lower side of the frame is the sickle-bar K, which is slightly curved downward at or near the outer side of the frame, as shown in Fig. 2, and is provided with suitable guard-fingers, within which the sickle vibrates. Affixed to the upper and rear side of said frame is a shaft, L, upon which is secured a gear-pinion, L', which engages with the wheel G of shaft G'. Attached to the opposite end of shaft L is a gear-wheel, M, which engages a gear-pinion, M', on shaft N, which is affixed to the lower side of the frame and extends forward to or near its front side, and is provided with a crank-wheel, N', to which the pitman $c$, communicating with the sickle, is connected. Thus a vibrating movement is imparted to the sickle by the forward movement of the machine. Attached to the lower and rear side of the frame is a supporting-arm, O, which is slightly curved downward at a point near the frame to a level with the sickle-bar, and extends outward laterally parallel with the same. Affixed to the upper surface of the sickle-bar and supporting-arm O are boxes $d\ d$, within which are secured the ends of the shafts P P'. Upon and around the said shafts are secured carrying-belts $e$, so arranged as to freely revolve with said shafts. Upon and around shaft P' are like belts $f$, which extend obliquely upward and around shaft Q, which is supported at each end within the uprights D D of the frame. Upon and around said shaft Q are corresponding belts $g$, which extend slightly downward to and around shaft Q', which is also secured at each end within said uprights above the husking-rollers E E'. Affixed upon the front end of shaft Q is a sheave-wheel, R, around which passes belt $h$, extending downward to and around a like sheave-wheel, R', affixed to the end of husking-roller E. Thus, as said roller is rotated by the revolving motion of the gear-wheels, imparted thereto by the forward movement of the machine, a rotary motion is communicated to the belts of the several carriers, by which the corn-stalks are conveyed to the husking-rollers after being cut from the hill by the action of the sickle, the several belts being provided with lugs $i$, which engage the stalks as they fall thereon. Attached to the upper side of the frame, near roller E', are vertical posts, to the upper ends of which is affixed a guiding-apron, S, by which the stalks are guided to or against said rollers as the same are discharged from the carriers. Securely connected to the frame, above the main shaft, and below said rollers, is a delivering-elevator, T, which extends longitudinally to or beyond the rear of the frame. Affixed upon the rear shaft of said elevator is a sheave-wheel, $m$, around and over which passes belt $n$, the same extending forward to and around a like sheave-wheel, $m'$, on shaft B, by which a rotary movement is imparted to the apron of the elevator. Connected to the frame, below the rear termination of said elevator T, is a like elevator, T', which extends obliquely upward and backward a sufficient distance to discharge the stalks into a wagon which may be connected to or follow the machine. Affixed to the shaft of the outer end of said elevator is a sheave-wheel, $q'$, around and over which passes a belt, $o'$, extending forward to and around a like sheave-wheel, $n'$, on the shaft of elevator T, by which a rotary movement is imparted thereto. Firmly affixed on shaft B is a sheave-wheel, U, around and over which passes belt $p$, which extends forward to and around a like sheave-wheel, U', on the reel-shaft V, which imparts a rotary motion to the same. The driving-wheel C is loosely fitted on shaft B, and its hub provided with a clutch which engages a corresponding clutch firmly affixed to the shaft. Thus, when the wheel is disengaged from the clutch the shaft is allowed to revolve within the wheel, which admits of readily turning the machine in position.

When it is desired to pick the ears from the stalks without husking, the fluted revolvers E E' may be removed and rollers having a smooth surface employed.

Attached to the lower side of the frame, under the husking-rollers, is a box, (not shown,) into which the corn is discharged as it is husked.

The moving parts may be thrown in or out of gear by any suitable arrangement that will produce the desired result.

In operating my machine the same is drawn forward, by which means the moving parts are made to perform their necessary functions, by which the corn-stalks are cut and conveyed to the husking-rollers, the rough surfaces of which engage and strip the husks from the ears, which fall into the box under the machine, and the stalks and husks are conveyed to the wagon or discharged upon the ground by the delivering-carriers.

Having thus described my invention, what I claim as new and desire to secure by Letters Patent, is—

The combination of the husking-rollers E E', guide-apron S, carrying-belts $e$, $f$, and $g$, delivering-elevators T T', the whole arranged to operate in connection with the sickle, substantially as and for the purpose described.

The above specification of my invention signed by me this 22d day of October, 1870.

DELOS C. FLINT.

Witnesses:
 JOHN H. HUBERT,
 J. T. SANDERS.